(12) United States Patent
Dunn

(10) Patent No.: US 7,306,062 B2
(45) Date of Patent: Dec. 11, 2007

(54) TRACTOR WITH HYDRAULIC SPEED AND STEERING CONTROL FOR STEERING AT MAXIMUM SPEED

(75) Inventor: James Thomas Dunn, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 219 days.

(21) Appl. No.: 11/188,293

(22) Filed: Jul. 25, 2005

(65) Prior Publication Data

US 2007/0017712 A1    Jan. 25, 2007

(30) Foreign Application Priority Data

Jul. 21, 2005   (CA)   .................................... 2513614

(51) Int. Cl.
    *B60K 170/00* (2006.01)
(52) U.S. Cl. ...................... 180/6.48; 180/307; 180/336
(58) Field of Classification Search ............... 180/6.48, 180/6.2, 335, 336, 305, 307, 308
    See application file for complete search history.

(56) References Cited

U.S. PATENT DOCUMENTS

| | | | |
|---|---|---|---|
| 4,281,737 A * | 8/1981 | Molzahn ...................... | 180/307 |
| 5,383,528 A * | 1/1995 | Nicol .......................... | 180/6.2 |
| 5,649,606 A | 7/1997 | Bebernes et al. | |
| 6,036,597 A | 3/2000 | Arner | |
| 6,397,966 B1 * | 6/2002 | Irikura et al. ................ | 180/307 |
| 6,629,577 B1 * | 10/2003 | Abend et al. ................ | 180/367 |
| 6,755,264 B2 * | 6/2004 | Hasegawa et al. ........... | 180/6.2 |
| 7,040,425 B2 * | 5/2006 | Hammonds ................. | 180/6.48 |
| 7,059,433 B2 * | 6/2006 | Hasegawa et al. ........... | 180/6.2 |
| 7,077,220 B2 * | 7/2006 | Dunn et al. .................. | 180/6.2 |

FOREIGN PATENT DOCUMENTS

| | | |
|---|---|---|
| RU | 2220856 | 1/2004 |
| SU | 1614947 | 12/1990 |

* cited by examiner

*Primary Examiner*—Kevin Hurley
(74) *Attorney, Agent, or Firm*—Adrian D. Battison; Michael R. Williams; Ryan W. Dupuis

(57) ABSTRACT

A tractor has hydraulically driven wheels at a cab end and castor wheels at an engine end. It can be driven cab forward in a working mode with a header on the forward end. It is rotated to engine forward in the transport position for more stable higher speed travel. The driven wheels are driven by hydraulic motors each having their own drive pump the output of which is controlled by a cam plate. The speed control is effected by a manually operable lever through a servo-cylinder which locates a speed control arm moving both cam plates to the set position. In a maximum speed position both cam plates are engaged against a stop. The steering is effected by moving the cam plates differentially to drive the wheels at different speeds. The piston rod of the servo-cylinder includes a spring relief so that the speed control arm can back off from the maximum position by moving the servo-cylinder body when steering in the maximum speed position.

15 Claims, 8 Drawing Sheets

TRACTOR WITH HYDRAULIC SPEED AND STEERING CONTROL FOR STEERING AT MAXIMUM SPEED

This invention relates to a hydraulically driven tractor of the type, commonly but not necessarily used as a swather tractor, which is supported on a pair of hydraulically driven wheels and a pair of castor wheels and steered by a differential speed between the driven wheels.

BACKGROUND OF THE INVENTION

Hydrostatically steered vehicles have been available for many years and their application to windrowers has been significant. There has been a limit to the transport speed of these windrowers due to instability at high speed with the drive wheels ahead of the castor wheels (cab forward). Higher speeds on the road allow the user to cover large distances without the use of trailers and tow vehicles.

In co-pending application filed Apr. 28, 2005, Ser. No: 11/116,418 and Canadian application filed Apr. 27, 2005, Ser. No: 2,505,458 and assigned to the present assignee is shown a machine in which the machine travels in transport mode with the castor wheels leading the drive wheels (engine forward), and in this position the machine is much more stable and higher speeds are possible.

While in a turn with a self propelled machine that has the steered wheels leading, the centrifugal force at the center of gravity is such that it tends to assist the rear driving wheels in straightening out the machine. On the other hand when in a turn with a self propelled machine that has the driving wheels leading, the centrifugal force at the center of gravity is such that it encourages the turn, and the front driving wheel must overcome this force in order to straighten out the machine. Thus the machine is more stable, or wants to travel more in a straight line, when the castor wheels are leading and the driven wheel are trailing.

Other bi-directional vehicles such as the Ford TV140, although hydrostatically driven, are not hydrostatically steered. The TV140 machine relies on the pivoting action between front and rear sections of the tractor to steer. Control of the TV140 machine is done using hydraulic valving and cylinders.

Coop Implements manufactured the model 742 windrower tractor which is bi-directional. This was done to allow the header to be detached and connected at the drive wheel end of the tractor. This also provided weight to the drive wheels to make the machine more controllable during transport.

In a typical machine of this type, the ground speed and steering of the machine is achieved by varying the flow output from two individual hydraulic pumps each driving a hydraulic motor attached to the drive wheels. In an application using hydraulic piston pumps, this flow is varied by changing the angle of the cam-plate or swash plate inside the pump which varies the displacement of the pump.

To vary the speed of the machine, both pump displacements are changed simultaneously. To steer the machine, the displacement of each pump is varied relative to each other so that the flow to each wheel is different which causes the machine to turn.

To achieve maximum efficiency, it is desirable to set the pumps at the highest possible displacement for any given speed. To obtain maximum speed of the machine, it is therefore desirable to have the displacement of both pumps at maximum when the machine is a full speed. The problem with this is that in order to steer the machine at full speed (with both pumps at full displacement) the steering mechanism must be allowed to decrease the displacement of one of the pumps against the pressure of the speed control tending to maintain it in the maximum position.

In a speed control system without a servo control, when the operator makes a turn at full speed, the steering system forces the ground speed lever back away from the full speed position since it is only retained there by a friction device.

In a servo controlled system, a servo control valve/cylinder is used to control the pump displacement with a smaller force being required by the operator. In this case, the servo force can be quite high in order to resist the pump cam-plate forces in all cases. This can cause a high steering effort required by the operator.

SUMMARY OF THE INVENTION

It is one object of the invention to provide an improved tractor of the above type and in particular an improved arrangement of the speed and steering control.

According to one aspect of the invention there is provided a tractor comprising:

a tractor frame;

an engine mounted on the tractor frame;

a cab mounted on the tractor frame;

a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure, with the first hydraulic pump arranged for driving the first hydraulic motor of the first driven wheel and the second hydraulic pump arranged for driving the second hydraulic motor of the second driven wheel;

the first hydraulic pump including a first cam plate movable to vary the displacement of the pump to vary the volume of fluid generated as the pump is driven and the second hydraulic pump including a second cam plate movable to vary the displacement of the pump to vary the volume of fluid generated as the pump is driven;

each of the first and second cam plates having a maximum position at which a maximum volume of fluid is generated, each maximum position being determined by an end stop;

a manually operable steering control movable between left and right positions through a center position;

a manually operable speed control movable between forward and reverse positions through a neutral position;

the manually operable speed control being arranged to control a rate of supply of hydraulic fluid from the first hydraulic pump to the first drive motor and from the second hydraulic pump to the second drive motor to control a common speed of rotation of the driven wheels and thus a speed of movement of the tractor;

the manually operable steering control being arranged to control a differential in rate of supply of hydraulic fluid from the first hydraulic pump to the first drive motor and from the second hydraulic pump to the second drive motor to control a relative speed of rotation of the driven wheels and thus a turning direction of the tractor;

a linkage including a first link for controlling the first cam plate and a second link for controlling the second cam plate;

the linkage including a speed control member operable by the manually operable speed control with the speed control member arranged, when actuated, to move both the first and second links for moving the first and second cam plates;

the linkage including a steering member operable by the manually operable steering control with the steering member mounted relative to the speed control member so as, when actuated, to move the first and second links relative to the speed control member to effect differential movement of the first and second cam plates;

the manually operable speed control including a manually operable lever defining a position input and a servo-cylinder arranged in response to the position input to move the speed control member to a position determined by the position input and to maintain the speed control member in the position by pressure in the servo-cylinder;

the manually operable speed control being arranged so as to provide a maximum forward position of the speed control member in which the first and second cam plates are located in their maximum positions against the respective end stop and are maintained in the maximum position by pressure in the servo-cylinder;

and a relief member operable, in the maximum forward position of the speed control member, on operation of the steering member by the manually operable steering control, to relieve pressure from the servo-cylinder to allow movement of the first and second links relative to the speed control member to effect differential movement of the first and second cam plates.

Preferably the relief member acts to allow movement of the speed control member from the maximum forward position thus allowing that one of the cam plates which is required to move away from the end stop to so move. However the relief member may be located at a position such that it can allow the required movement of the cam plate without movement of the speed control member.

Preferably the relief member acts to allow movement of the speed control member without requiring movement of the servo-cylinder. Thus there is provided a motion arrangement which allows the required movement without movement of the servo-cylinder. However the same effect can be obtained by releasing or adjusting the pressure in the servo-cylinder so that movement is obtained but while avoiding the high forces generated by the servo-cylinder.

Another alternative that was considered is to accurately control the servo hydraulic supply pressure and allow the servo to hydraulically relieve itself to allow the operator to steer at full speed. This would likely require the addition of a pressure reducing valve which can be expensive and perhaps troublesome in operation.

Preferably the relief member comprises a spring mounted to take up movement of the speed control member without requiring movement of the servo-cylinder.

Preferably the spring is mounted at the servo-cylinder but it can also be located at other positions in the linkage system which allow the movement of the cam plate without requiring movement of the servo-cylinder.

In particular it is preferred that the spring is mounted between the servo-cylinder and a reference location or fixed position from which the servo-cylinder is driven.

As an alternative the spring mechanism could be attached to the servo base end. The problem with this design is that when the pump cam plate forces are high (for instance when the machine is climbing a hill and the drive pressures are high) the spring mechanism at the servo base end would deflect and the machine would decrease in speed. With the proposed system, if the spring mechanism on the servo cylinder rod deflects, the servo body moves and since the servo control spool is fixed by the ground speed lever, the servo will adjust hydraulically and maintain the selected speed.

Preferably the spring comprises two parts each arranged on an opposite side of a center position such that the servo-cylinder body can move in one direction at maximum forward position and in an opposed direction at maximum reverse position where each of the two parts of the spring can butt against a center plate connected to the reference location.

Preferably there is provided a support member which engages each of the two parts of the spring and holds it away from the center plate when the other of the springs is compressed and butts against the center plate.

Thus there is a pin through the servo cylinder rod which has a diameter which is slightly less than the thickness of the stationary mount plate. This pin fits into a slot in the stationary mount plate when the system is in the neutral position. As one of the springs deflects, the pin moves out of the slot and retains the compression of the other spring. In this way, the spring force increases quickly. If this pin were not in place, then as the springs deflect, one spring loses force as the other gains force and the resultant force changes much more slowly. We found that in this case, the system would sometimes get into a pulsing situation where the servo would hunt back and forth as the springs deflected.

Preferably the servo-cylinder includes a cylinder in which the piston is mounted and a servo-control spool connected to the manually operable lever such that the servo-control spool controls supply of hydraulic fluid under pressure to one or other side of the piston depending upon movement of the spool by the manually operable lever.

According to a second aspect of the invention there is provided a tractor comprising:

a tractor frame;

an engine mounted on the tractor frame;

a cab mounted on the tractor frame;

a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure, with the first hydraulic pump arranged for driving the first hydraulic motor of the first driven wheel and the second hydraulic pump arranged for driving the second hydraulic motor of the second driven wheel;

the first hydraulic pump including a first cam plate movable to vary the displacement of the pump to vary the volume of fluid generated as the pump is driven and the second hydraulic pump including a second cam plate movable to vary the displacement of the pump to vary the volume of fluid generated as the pump is driven;

each of the first and second cam plates having a maximum position at which a maximum volume of fluid is generated, each maximum position being determined by an end stop;

a manually operable steering control movable between left and right positions through a center position;

a manually operable speed control movable between forward and reverse positions through a neutral position;

the manually operable speed control being arranged to control a rate of supply of hydraulic fluid from the first hydraulic pump to the first drive motor and from the second hydraulic pump to the second drive motor to control a common speed of rotation of the driven wheels and thus a speed of movement of the tractor;

the manually operable steering control being arranged to control a differential in rate of supply of hydraulic fluid from the first hydraulic pump to the first drive motor and from the second hydraulic pump to the second drive motor to control a relative speed of rotation of the driven wheels and thus a turning direction of the tractor;

a linkage including a first link for controlling the first cam plate and a second link for controlling the second cam plate;

the linkage including a speed control member operable by the manually operable speed control with the speed control member arranged, when actuated, to move both the first and second links for moving the first and second cam plates;

the linkage including a steering member operable by the manually operable steering control with the steering member mounted relative to the speed control member so as, when actuated, to move the first and second links relative to the speed control member to effect differential movement of the first and second cam plates;

the manually operable speed control including a manually operable lever defining a position input and a servo-cylinder having a servo-cylinder body and a piston including piston rod movable relative to the servo-cylinder body;

the servo-cylinder body being connected to the speed control member and the piston rod being connected to a reference location such that the servo-cylinder acts, in response to the position input, to move the speed control member to a position determined by the position input and to maintain the speed control member in the position by pressure in the servo-cylinder;

the manually operable speed control being arranged so as to provide a maximum forward position of the speed control member in which the first and second cam plates are located in their maximum positions against the respective end stop and are maintained in the maximum position by pressure in the servo-cylinder;

and a relief spring mounted between the piston rod and a reference location so as to allow movement of the servo-cylinder body and the speed control member to allow, in the maximum positions of the first and second cam plates, the first and second links to move relative to the speed control member to effect differential movement of the first and second cam plates.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
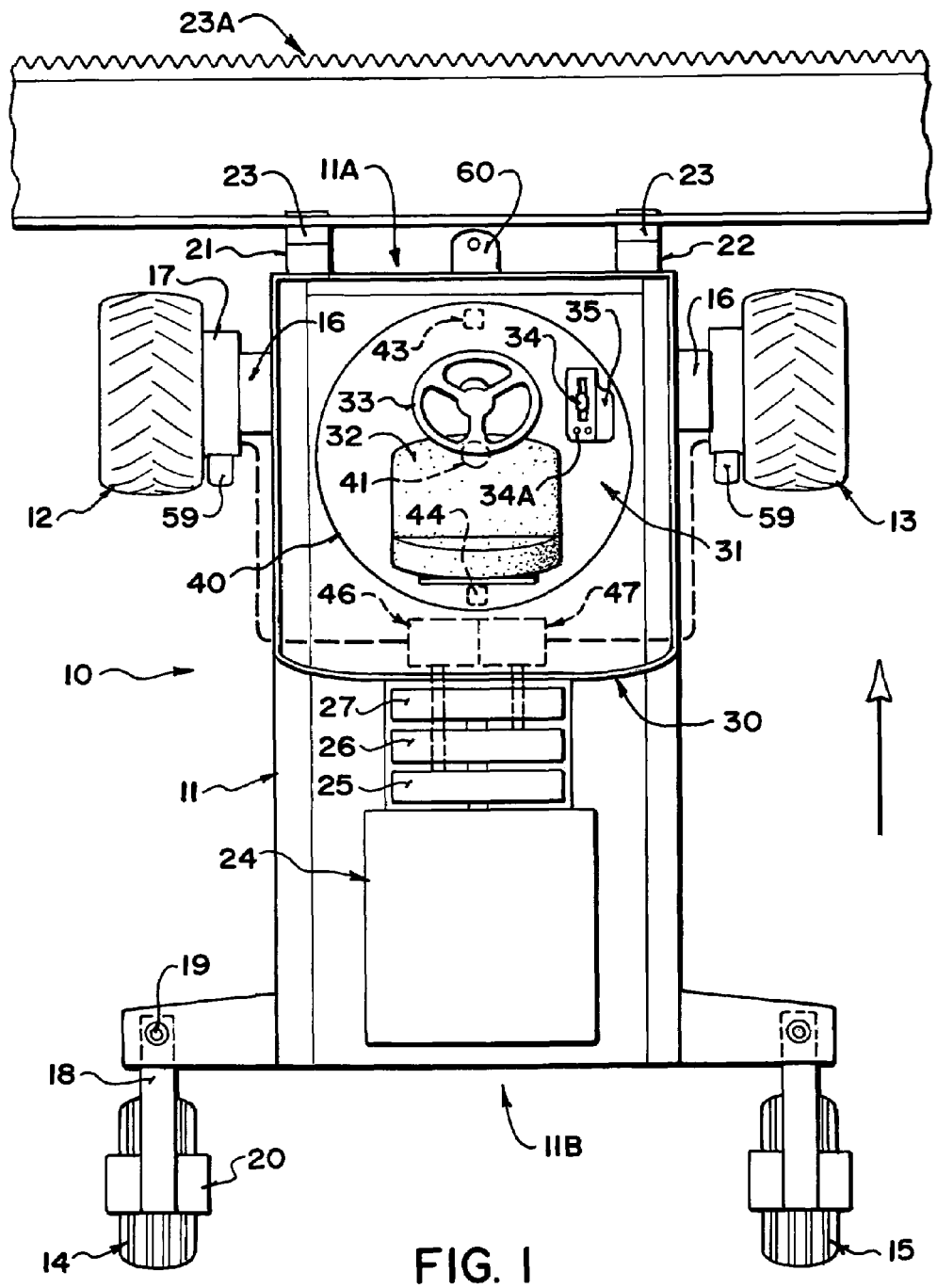
FIG. 1 is a top plan view partly in phantom and partly broken away showing a tractor according to the present invention in the cab forward position.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches include a header height and angle control by way of a four way (two axis) switch 35A, a reel height and forward location control by way of a four way (two axis) switch 35B and a reel speed control two way one axis switch 35C so that the skilled operator can control the parameters of the header during the working action. The header is engaged by a main drive control lever 35D in many cases also be reversed in the event of a blockage and thus will include a switch 35E for allowing such reversal.

Many of the above components are well known and conventional and can be found in many different designs of such tractors manufactured by a number of manufacturers including the present assignee. Further details of the reel speed control and reel location control are disclosed in the above co-pending application to which reference may be made filed simultaneously with this application.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIG. 2 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

The positioning of the platform in the two positions is detected by a pair of switches 43 and 44 which co-operate with an element 45 carried on the platform. Thus only when the platform and the seating console are properly located and fixed in one of the selected positions, is this position detected by the respective switch 43, 44 which is used in the control system as set forth hereinafter. The speed control 34 and the accessory control 35 and the display board 32A are fixed relative to the seat and the platform so that they rotate with the platform. Thus the operator, in both positions has the controls arranged exactly in the same position for operation in an exactly symmetrical manner. Thus the speed control works in the same manner in that rearward drives the vehicle toward the rear of the operator as the operator sees at the time and forward movement of the lever drives the lever forwardly in the orientation of the operator at the time. Mechanical and electrical coupling extend from the control systems including the steering, speed control and accessory control from the platform, through the support shaft 41 to a position underneath the frame where those communicating mechanical and electrical links cooperate with the relevant structures underneath the vehicle for controlling the movement of the vehicle. It will be appreciated that, when the operator is in the cab forward position shown in FIG. 1, movement of the speed control lever toward the end 11A moves the vehicle in the direction of the end 11A. When the seat is reversed, movement of the same lever in a direction away from the operator moves the lever toward the end 11B and must operate the tractor to move the vehicle along the direction toward the end 11B. This requires the linkage to be reversed since the effect of the lever must be reversed as the seat is rotated from one position to the other. This can be achieved by mechanical linkage or can be achieved by electrical and/or hydraulic connections as will be apparent to one skilled in the art.

Figure 2:
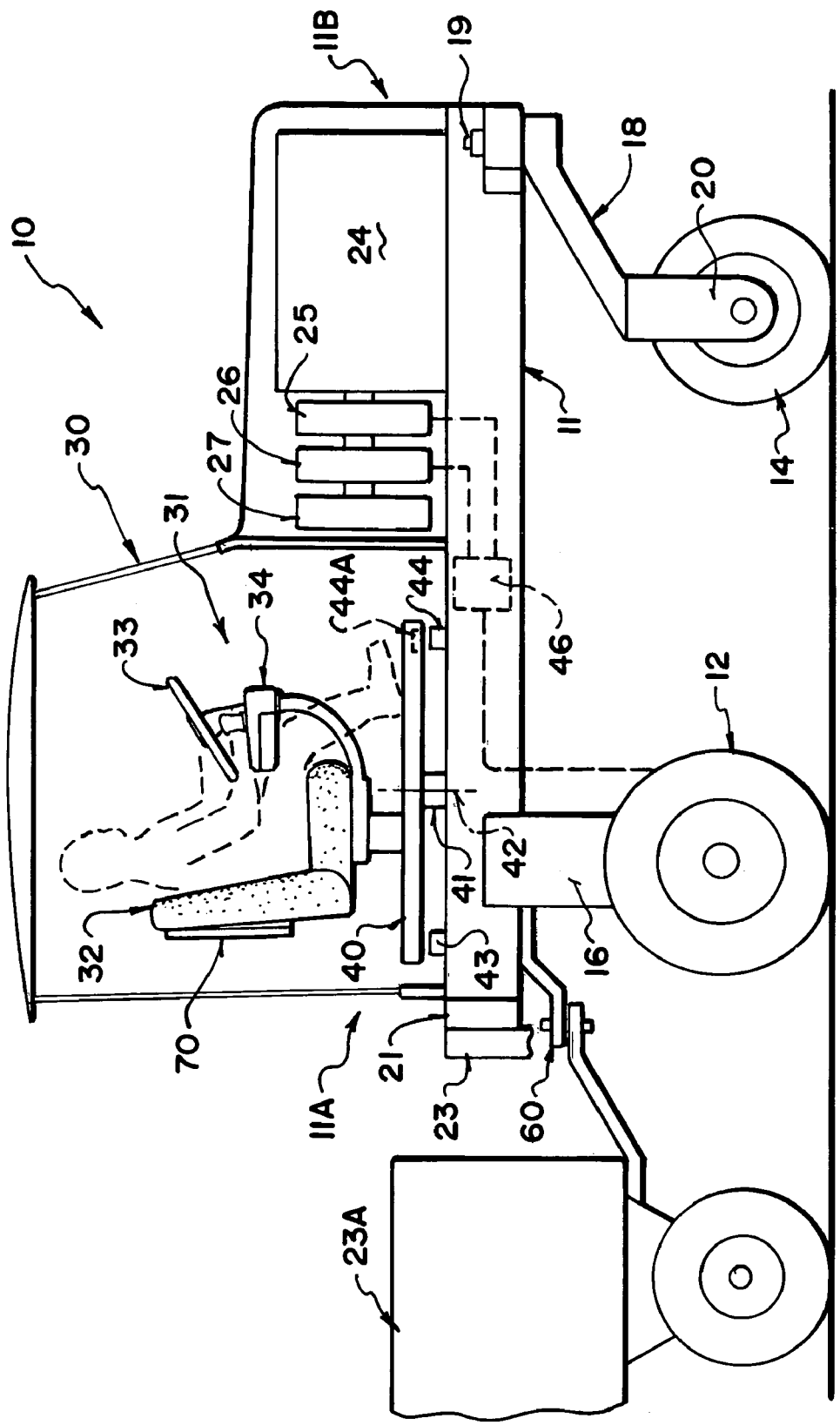
FIG. 2 is a side elevational view of the tractor of FIG. 1 in which the operators seat and console have been rotated for operating the tractor in an engine forward position.
Figure 3:
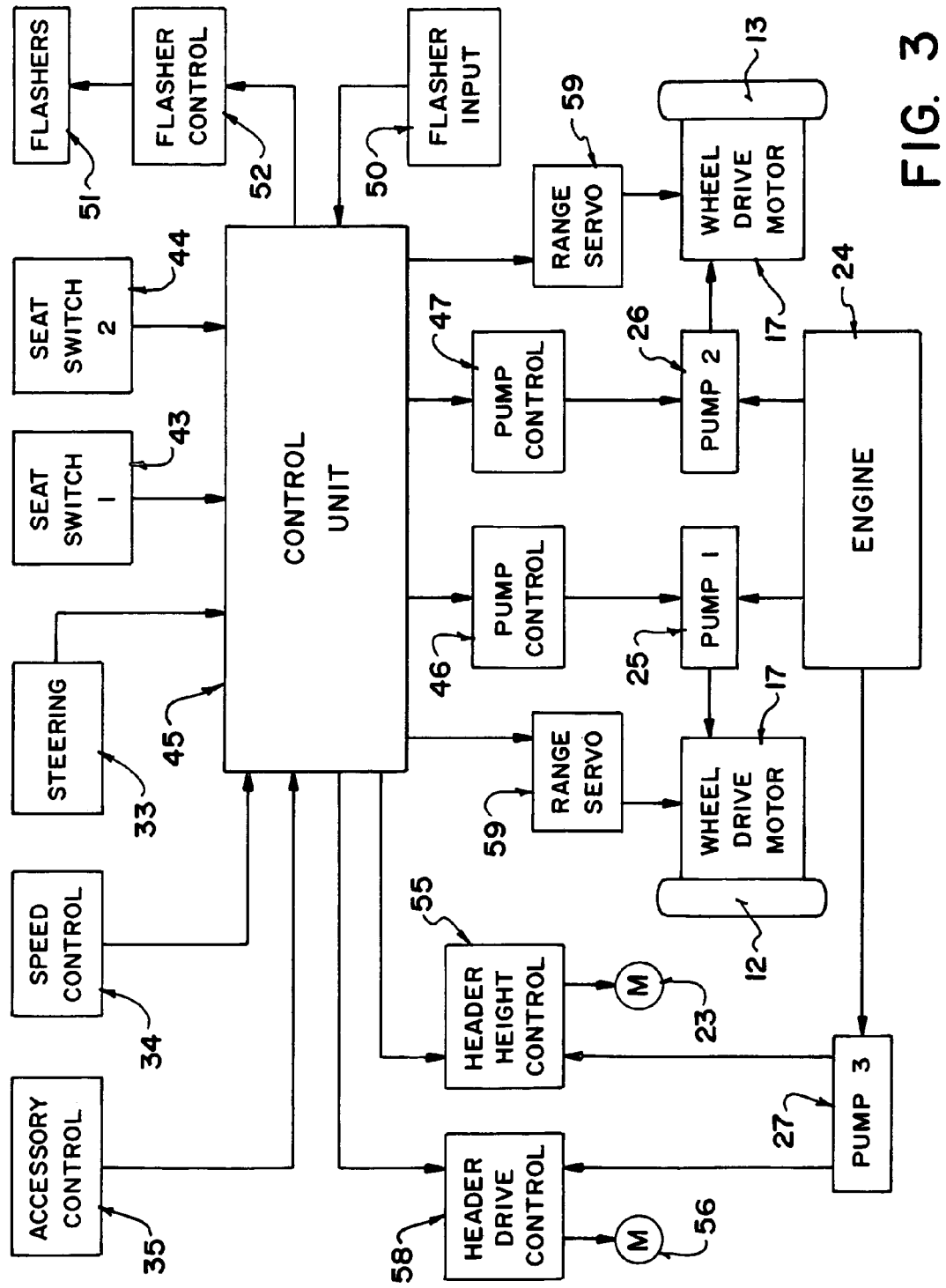
FIG. 3 is a schematic illustration of the control system for the tractor.
Figure 4:
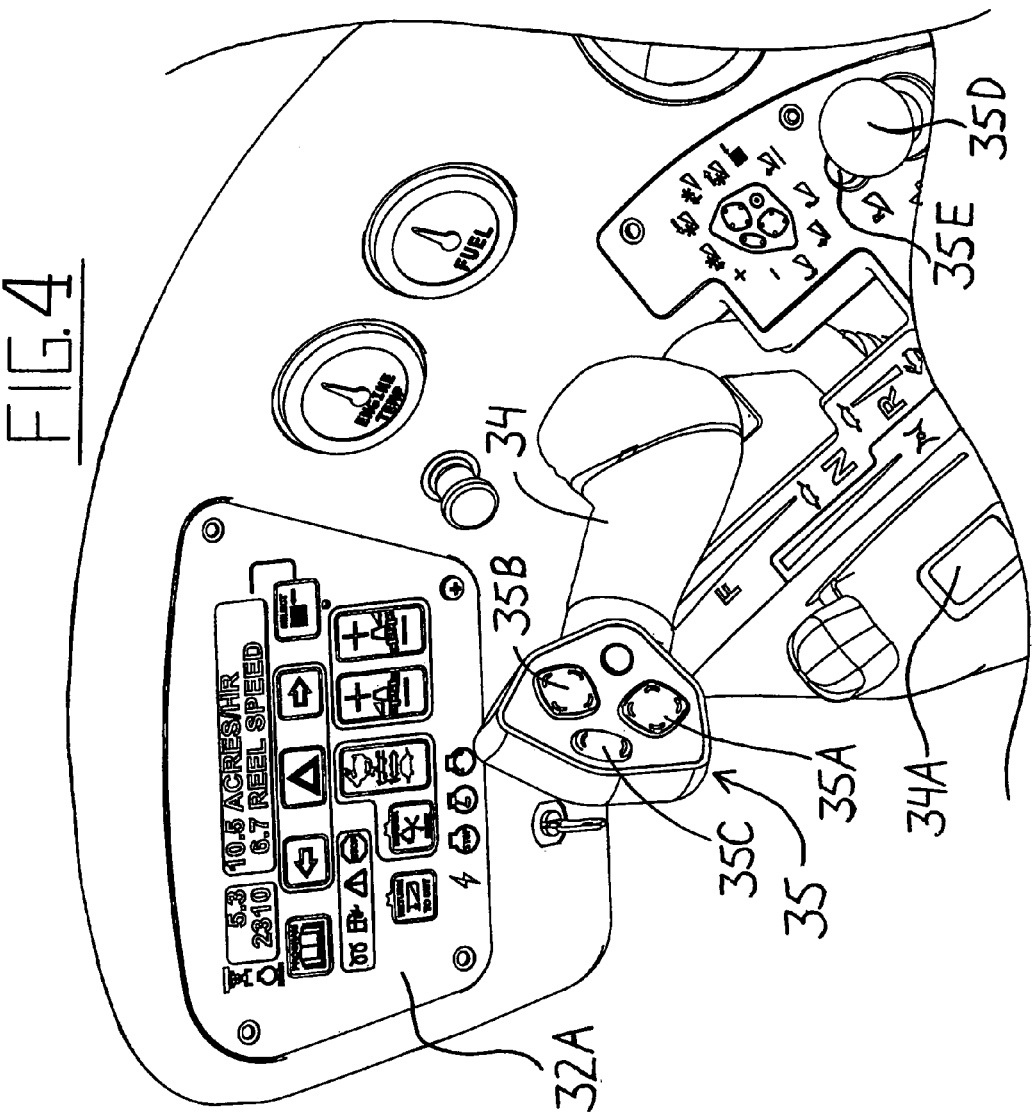
FIG. 4 is a top plan view of the control elements of the console of FIGS. 1, 2 and 3.

Turning now to the mechanical section as shown in FIG. 1 and the schematic control system as shown in FIG. 3. The speed control system 34 controls the pumps 25 and 26 through pump controls 46 and 47. The pump 25 supplies fluid to the drive motor 17 of the wheel 12. The pump 26 supplies fluid to the motor 17 of the wheel 13. The pumps are controlled to control the displacement of the pumps and therefore the amount of fluid generated in conventional manner. The rate of flow of fluid controls the rate of rotation of the respective motor so that the wheels rotate at a selected speed determine by the control of the pumps 25 and 26.

In addition the steering 33 controls the pumps 25 and 26 to generate a differential in the flow thereof so as to generate a differential in the speed of the motors 17. In the schematic illustration of a system shown in FIG. 3, this operation is shown as effected by a control unit 45 which is responsive to the signal from the steering and from the speed control and thus selects the positions of the pumps accordingly. However in the system described hereinafter, this is effected mechanically by providing two separate inputs to the pump control arrangement to provide a required speed and then a differential between the two pump controls.

As shown in FIG. 3 the control unit 45 is also responsive to input from the seat switch sensors 43 and 44 so that operation of many of the systems shown in FIG. 3 is only possible when the seat switch is actuated indicating that the platform is in a selected one of the two positions. In addition the indication from the respective seat switch of the selected position of the seat console is entered into the control unit to control the operation of the tractor in dependence of the cab forward or engine forward orientation.

In addition to the basic control of the movement of the vehicle, the control unit also provides outputs for controlling other elements of the tractor. In a first element the control console includes a conventional flasher input lever indicated at 50 by which the operator can operate turn signals or four way flashers as indicated by the flashing lights 51. The control unit is arranged so that the four flashers indicated at 51 can be operated simultaneously by the flasher control 52 in both positions of cab forward and engine forward described previously. However, as it is intended that primary mode of high speed transportation of the tractor is in the engine forward position, the turn signals are operated by the flasher control 52 so that the turn signals will only operate when the operator console and tractor are arranged in the engine forward position as detected by the respective seat switch.

The header drive system including the height control cylinders 23 actuated by a control system 55 is driven with fluid from the pump 27 also driven by the engine 24. The pump also supplies fluid to a motor 56 which drives the operation of the header. This drive can comprise a single motor driving all the components of the header including the cutting knife, the reel and any collection system including drapers and/or augers. However individual motors and individual controls can be provided.

The control unit 45 is arranged, in response to operation of the seat switch indicating that the operator console is in the cab forward position acts to allow actuation of the motor 56 through the drive control 58. When the seat is out of that position and particularly turned to the engine forward position, actuation of the header is prevented.

The height control 55 is arranged to provide adjustment of the height of cutting action and also to provide a raised position away from the cutting action. The control unit 45 is arranged to control the header/height control 55 so that the header is maintained in the raised inoperative position and cannot fall under automatic control to the cutting position when not in cab forward position.

The drive motors 17 also include adjustment by a servo unit 59 which selects different ranges for the motor. This is obtained by adjusting the cam plate of the motor to different displacement positions as is well known to one skilled in the art.

In one embodiment the drive motors 17 are arranged to have two different ranges that is a low speed range and a higher speed range. It is of course appreciated that the low speed range provides higher torque.

The control unit is arranged such that the high speed range can only be accessed when the operator console is in the engine forward position and thus cannot be accessed when the operator console is in the cab forward position. In this arrangement when the operator operates essentially one of the switches 35 to select one or other of the ranges, in the situation where the operator console is in the cab forward position, the system indicates to the operator that the high range cannot be accessed. In this way the intention is that the tractor can travel at significantly higher speeds in the engine forward position and is restricted to the lower speeds when in the cab forward position, bearing in mind that the tractor is unstable at the higher speeds when in the cab forward position.

In an alternative arrangement a three range motor can be provided with low, intermediate and high ranges accessible. In this arrangement the low and intermediate ranges are accessible in the cab forward position and the low and high ranges are accessible in the engine forward position. In the engine forward position the low ranges available for high torque and the high ranges are available for high speed. In the cab forward position the intermediate range is available for higher speed operation in the field.

Figure 5:
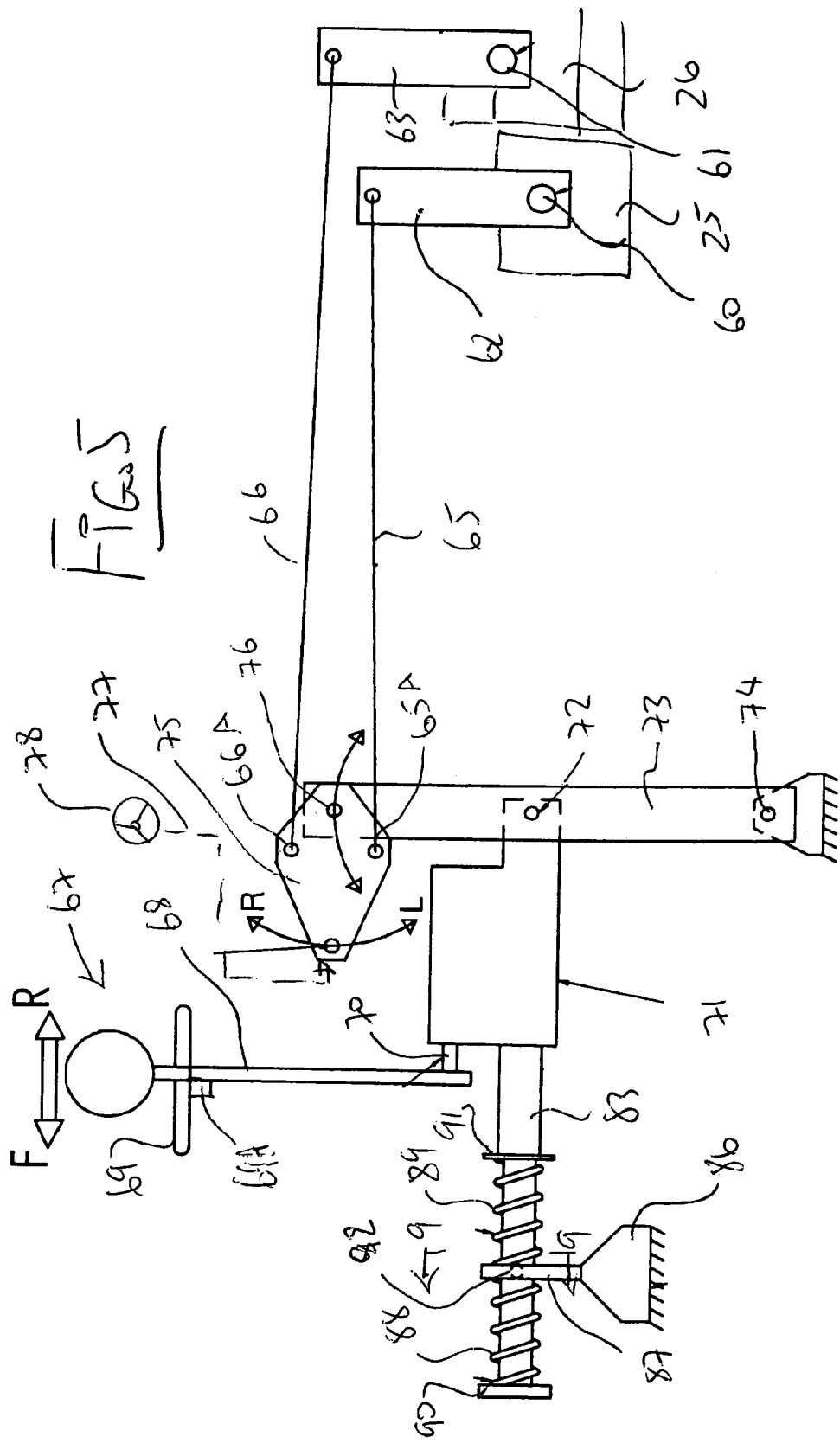
FIG. 5 is a schematic illustration of the linkage controlling the cam plates of the pumps providing hydraulic fluid for driving the driven wheels of the tractor of FIG. 1, showing the linkage in the neutral position of the speed control and the mid position of the steering control.

In FIG. 5 is shown schematically the linkage for actuating the movement of the cam plates of the two pumps for providing a selected volume of flow from each pump to the respective driven wheel. Thus the first pump 25 and the second pump 26 are shown schematically in FIG. 5 and each includes a respective control shaft 60, 61 for the cam plate of the pump. Pumps of this type are of course well known and their construction is well known to one skilled in the art and such pumps are commercially available from many sources.

Figure 6:
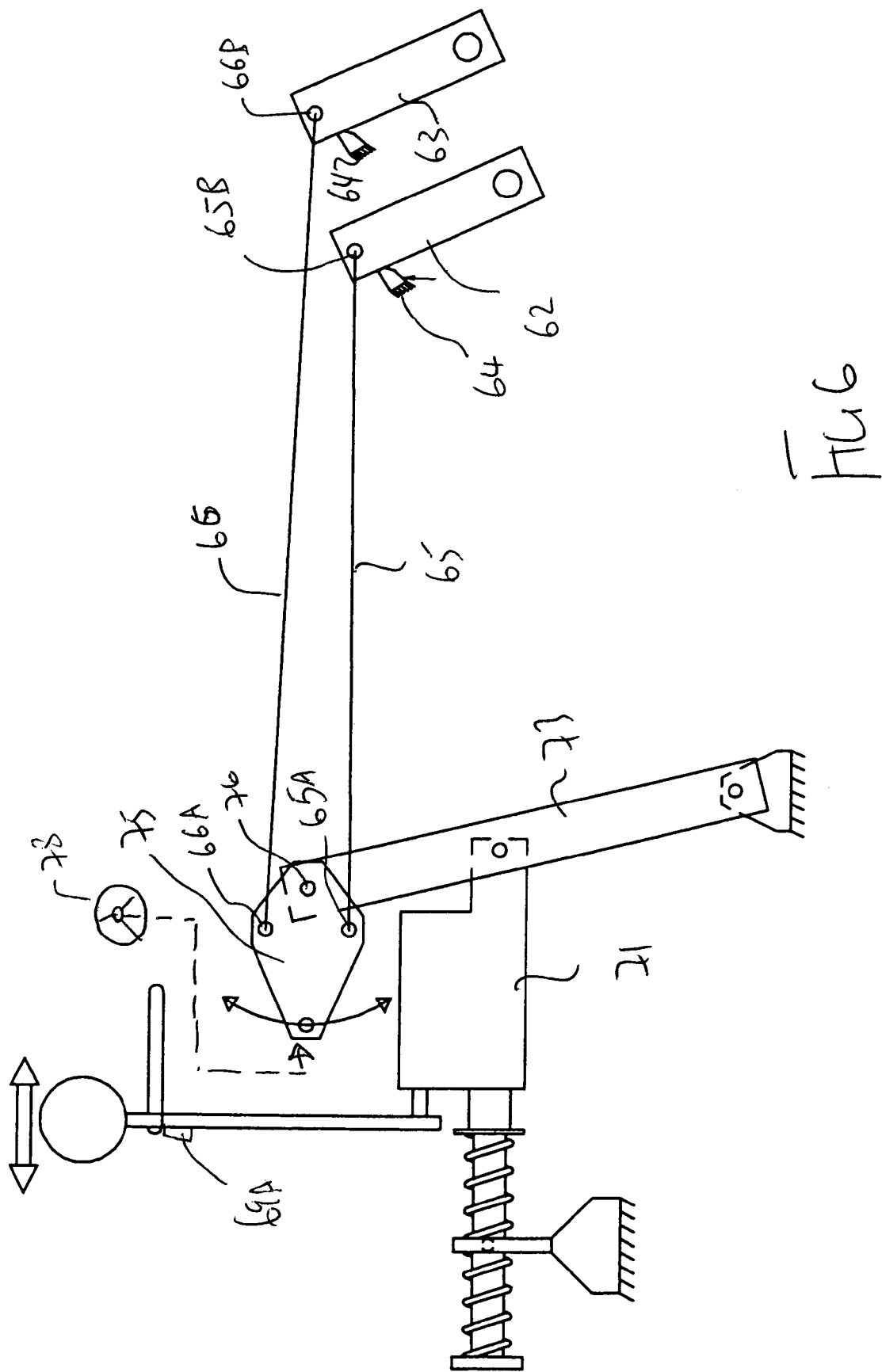
FIG. 6 is a schematic illustration of the linkage of FIG. 5, showing the linkage in the maximum forward speed position of the speed control and the mid position of the steering control.

Each of the shafts 60, 61 is controlled in its position by a respective actuation lever 62, 63. In FIG. 5 the levers are shown in a neutral position in which the cam plate has zero displacement so that no fluid flow is developed as the pump rotates. In FIG. 6, the levers have been moved to a maximum forward position against an end stop 64 so that each lever is moved from the vertical minimum position of FIG. 5 to an angled maximum position in FIG. 6. The end stop is shown schematically as a mechanical element separate from the lever and located on the pump but the end position of the movement can be determined by any suitable element either at the pump or at another location which limits the movement of the cam plate. Indeed the physical movement of the cam plate itself may act as the end stop without any necessity for an extra element contacting the lever. The movement of the levers is actuated by a pair of links 65 and 66 which are a fixed length and extend from a respective end 65A 66A at a control element of the linkage through to an end 65B, 66B at the respective lever. As the length of each link is fixed, movement of the ends 65A, 66A is transmitted to the lever in direct proportion.

The movement of the link 65 and 66 is controlled by two elements of the linkage shown in FIG. 5. Thus there is provided a manually operable speed control generally indicated at 67 which includes a manually operable lever 68 movable within a guide slot 69. The lever 68 is attached by a bar 70 to a servo cylinder 71. The servo cylinder 71 is connected by a pin 72 to a lever 73 the lever 73 forms a speed control member which is connected to both the ends 65A and 66A so that pivotal movement of the lever 73 about a mounting pin 74 in a common plane with the link 65 and 66 pushes the links commonly generally along their length so that the movement of the lever 73 is communicated to movement of the arms 62 and 63 of the pumps. The amount of movement of the lever is thus communicated to both arms 62 and 63 simultaneously and commonly at a proportion of the angle of movement which is dependent upon the geometry of the system. The geometry can of course be modified according to one skilled in the art and is shown only schematically.

Thus as illustrated, movement of the servo cylinder 71 to the left pulls the lever 73 which pulls the link 65 and 66 rotating the arm 62 and 63 to increase the angle of the cam plate from the neutral position through to the maximum position.

The control linkage also includes a steering member 75 which is carried on the lever 73 and which is connected to the ends 65A and 66A of the links. Thus the movement of the lever 73 is communicated to the link 65 and 66 through the structure of the steering member 75. The steering member 75 is mounted for pivotal movement about a pin 76 at the end of the lever 73 remote from the pin 74. When the steering member 75 remains fixed in a central position as shown in FIG. 5 about the pin 76, movement of the lever 73 is communicated to the link 65 and 66 as common movement without any differential. However differential movement between the link 65 and 66 can be provided by pivotal movement of the steering member 75 about the pin 76. In this way as the lever 73 remains stationary the ends 65A and 66A can be moved relative to one another by the pivotal movement of the steering member 75 about the pin 76. The steering member 75 is actuated in its movement by a linkage 77 from the manually operable steering control 78 generally in the form of a steering wheel. The linkage is shown only schematically from the steering wheel to the steering member 75 since this can be constructed in many different ways as well known to one skilled in the art. However it will be appreciated that turning of the steering wheel from right to left through a mid position will actuate pivotal movement of the steering member 75 from right to left as indicated about the pin 76. The steering movement can be effected while the lever 73 remains stationary or while the lever is moved since these movements are basically independent of one another. In FIGS. 5 and 6 the steering member is shown in the central or straight ahead position whereas in FIG. 7 the steering member 75 is pivoted to one end as indicated at R so that the steering member 75 pivots about the pin 76 on the lever 73.

Figure 8:
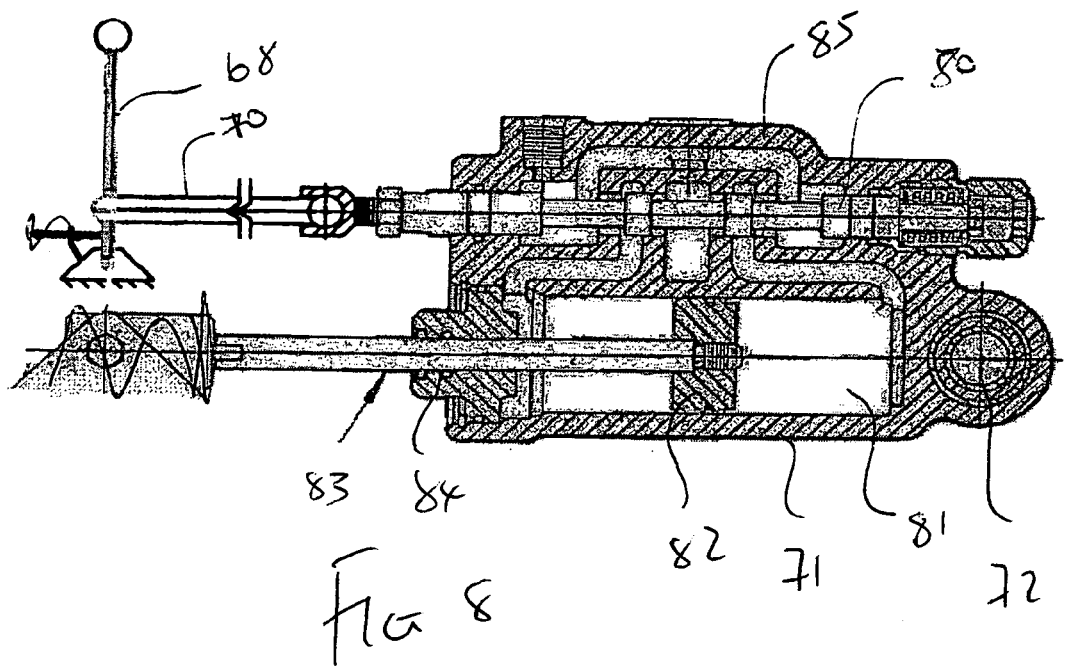
FIG. 8 is a more detailed view of the servo-cylinder of FIG. 5.

The construction of the servo cylinder is shown in FIG. 8. The servo cylinder 71 includes a spool 80 and a cylinder 81. Within the cylinder 81 is mounted a piston 82 which carries a piston rod 83 projecting out of one end 84 of the cylinder 81. Servo cylinders of this type are well known and commonly used in this type of system. Without going into detail as to the particular fluid paths, since these are well known to one skilled in the art, the general operation of the device is that the manually operable speed control 68 moves the bar 70 attached to the spool 80 within a spool housing 85. The spool is thus moved axially along the spool housing 85. The spool is located relative to the fluid supply conduits so that movement of the spool causes flow of hydraulic fluid under pressure to one side or the other side of the piston 82 within the cylinder 81. Thus if the bar 70 is moved to the right by the manual operation of the control 68, the spool also moves to the right and this acts to supply fluid to the right hand end of the cylinder so that the body of the servo cylinder formed by the cylinder and the spool housing moves toward the right relative to the piston 82 which is held in effect stationary. Thus the body 71 of the servo cylinder moves to the right until the spool housing is returned to its basic or central position relative to the spool whereupon the flow of fluid to the right hand end of the cylinder is halted and the servo cylinder 71 stops at that set position. Symmetrically the same operation occurs if the bar 70 is moved to the left. Thus the bar 70 acts as an input for a required set location of the servo cylinder body and the servo cylinder body moves to take up this position by causing the required flow of fluid to the cylinder to move the cylinder and the servo cylinder body to the required position thus set.

Figure 9:
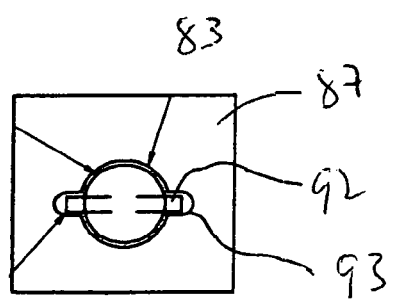
FIG. 9 is a cross-sectional view along the lines 9-9 of FIG. 5

In the arrangement of the present invention the piston rod 83 which emerges from the left hand of the servo cylinder body 71 underneath the bar 70 and the spool carried by this bar 70 extends from the servo cylinder to the left to be attached to a reference location 86. The reference location is in effect a fixed location within the structure of the tractor and thus holds the piston rod 83 relative to the fixed location to provide a reference for the piston rod and for the piston thus controlling the movement of the servo cylinder body 71. In this arrangement, however, the reference location 86 includes a coupling plate 87 through which the rod 83 passes. On either side of the plate 87 is provided a spring 88, 89 which provides a spring force relative to the plate up to a respective washer 90, 91 mounted on the rod 83. Thus in the central position shown in FIG. 5, both springs are slightly compressed or under no tension so that the springs act to locate the piston rods 83 at a position in which the washers 90 and 91 are equi-distant from the center plate 87. A pin 92 extends across the rod 83 at the plate 87 and can pass through a slot 93 (FIG. 9) in the plate 87. Thus the end of the spring 88 and the end of the spring 89 butts both against the plate 87 and the pin 92.

As explained previously, the lever 73 controls the common position of the arm 62 and 63 up to the maximum position at the end stops. Independently the steering member 75 acts to adjust the differential between the arms 62 and 63 by pivoting about the pin 76 on the arm 73. The position of the arm 73 is controlled by the servo cylinder 71 which, in normal operation, has its piston rod 83 maintained at a fixed position by the action of the springs 88 and 89 relative to the plate 87.

The lever 68 is maintained at a set position in the slot 69 by a friction device indicated at 69A so that normally the position of the lever 68 is set by the operator and this locates the position of the servo cylinder and thus the lever 73 which remains fixed during the operation until adjusted by the operator.

However in some modes of operation of the tractor, the tractor is operated at maximum speed either in the forward or rearward direction by the operator moving the lever 68 to the maximum forward or maximum reverse positions. In this position shown in FIG. 6 both arms 62 and 63 are located against the end stop 64 and the lever 73 is moved to its maximum position by movement of the servo cylinder 71. This position is maintained in the straight ahead position at maximum speed. However, if it is desired to steer the vehicle to one side, this must be achieved by moving the steering member 75 by operation of the steering wheel 78 so that it pivots relative to the pin 76. When this pivoting movement occurs, one of the arms indicated at 63 is moved away from its end stop. In order for this to occur, the lever 73 must pivot to the right to accommodate this movement.

As the lever 73 is pulled to the right, the position of the piston rod 83 in the servo cylinder remains unchanged so that the piston rod also moves to the right. This movement is accommodated by the action of the plate 87 compressing the spring 88. Thus the movement of the servo cylinder and the piston rod can occur simply by compressing the spring 88 so that the force necessary by the operator to turn the steering wheel and therefore to pivot the steering member 75 is dependant upon the strength of the spring 88 and thus is controllable to a suitable force which is acceptable to the operator without being excessive.

It will be noted that the spring 89 butts against the pin 92 so that the spring 89 is moved away from the plate 87 by the pin 92 and thus applies no force to the plate 87. Thus the whole of the movement is resisted by the compression of the spring 88 without any force being applied by the spring 89. In this way the spring force increases more rapidly to provide a resistance to the steering action and also to return the piston rod and the servo cylinder back to the center position as the steering is turned back to the mid position of the steering member 75.

It will be noted that the lever 68 is carried by the arm 70 with the movement of the servo cylinder body 71 toward the right overcoming the resistance of the friction member 69A at the slot 69. Thus, in a severe turn only, the lever moves away from the maximum forward position indicative of the movement of the lever 73. However when the steering returns to the center position and the lever 73 is moved back to its maximum position by the spring 88 the arm 68 moves back to the maximum position in the slot 69.

In the above system, the control lever (ground speed lever) 68 is not spring centered but is held at a given setting by the friction device 69A. The hydraulic pressure supply for the servo-cylinder is from the supercharge circuit which feeds oil to the pump system. The minimum pressure in this circuit is determined by the hydraulic system requirements and can vary with temperature and other variables which makes it difficult to predict actual pressure available.

Thus the arrangement provides a spring mechanism 88, 89 attached to the servo cylinder rod 83 which allows the steering of the machine even when the speed control is at maximum.

FIG. 5 shows the system in the neutral position with ground speed at zero and steering centered. The springs 88, 89 at the servo cylinder rod 83 are in equilibrium, each captured between the stationary mount 87 and the washer fixed to the servo cylinder rod. Both pump cam plates are at zero degrees giving a pump flow of zero.

FIG. 6 shows the system at full ground speed in the forward direction. Ground speed lever 68 is at full forward position and both pump cam plates are at maximum angle giving full pump flow. The springs 88, 89 at the front of the servo are again in equilibrium or perhaps the front spring 88 may be compressed slightly to ensure that both pumps remain at full stroke. The servo is set up so that it has some extra displacement available to ensure this.

Figure 7:
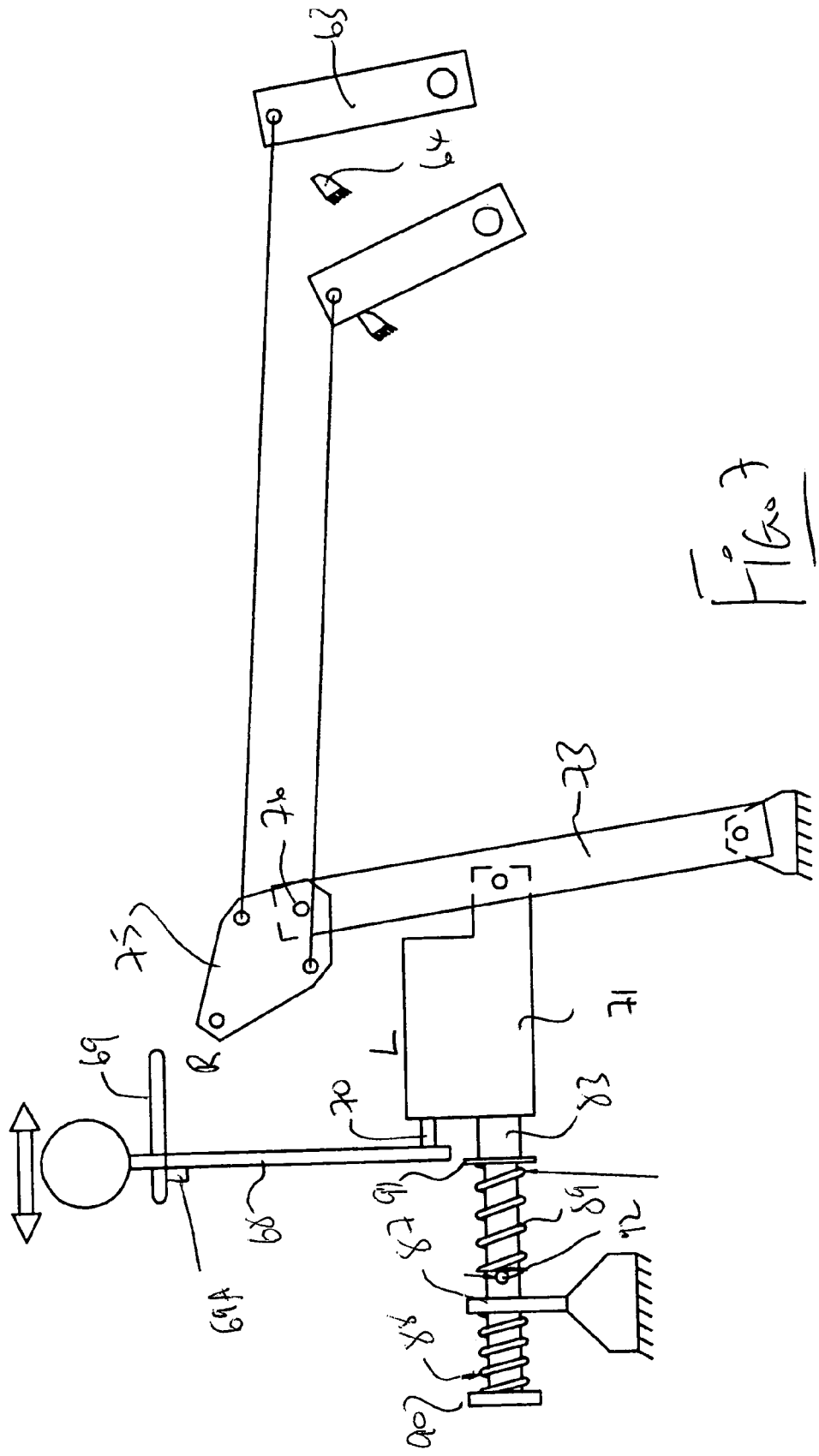
FIG. 7 is a schematic illustration of the linkage of FIG. 5, showing the linkage in the maximum forward speed position of the speed control and a turn position of the steering control.

FIG. 7 shows the system in a turn at full speed. During a very slight turn, the ground speed lever remains fixed while the front spring 88 at the front of the servo deflects allowing the one pump to be de-stroked as the steering control plate 75 is turned. During a more severe turn, the ground speed lever 68 is forced back as shown as the spring 88 at the front of the servo deflects.

As an alternative the spring mechanism could be attached to the servo-cylinder base end 72. The problem with this design is that when the pump cam plate forces are high (for instance when the machine is climbing a hill and the drive pressures are high) the spring mechanism 88 at the servo base end would deflect and the machine would decrease in speed. With the proposed system, if the spring mechanism on the servo cylinder rod deflects, the servo body moves and since the servo control spool is fixed by the ground speed lever, the servo will adjust hydraulically and maintain the selected speed.

Another alternative that is possible is to accurately control the servo hydraulic supply pressure and allow the servo to hydraulically relieve itself to allow the operator to steer at full speed. This requires the addition of a pressure reducing valve which can be expensive and perhaps troublesome in operation.

Another feature of the arrangement disclosed is the way the springs 88, 89 are set up on the servo cylinder rod. The pin 92 through the servo cylinder rod which has a diameter which is slightly less than the thickness of the stationary mount plate. This pin fits into the slot 93 in the stationary mount plate 87 when the system is in the neutral position. As one of the springs deflects, the pin moves out of the slot and retains the compression of the other spring. In this way, the spring force increases quickly. If this pin were not in place, then as the springs deflect, one spring loses force as the other gains force and the resultant force changes much more slowly. In such an arrangement it is possible that the system can sometimes get into a pulsing situation where the servo would hunt back and forth as the springs deflected.

Since various modifications can be made in my invention as herein above described, and many apparently widely different embodiments of same made within the spirit and scope of the claims without departure from such spirit and scope, it is intended that all matter contained in the accompanying specification shall be interpreted as illustrative only and not in a limiting sense.

The invention claimed is:

1. A tractor comprising:

a tractor frame;

an engine mounted on the tractor frame;

a cab mounted on the tractor frame;

a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure, with the first hydraulic pump arranged for driving the first hydraulic motor of the first driven wheel and the second hydraulic pump arranged for driving the second hydraulic motor of the second driven wheel;

the first hydraulic pump including a first cam plate movable to vary the displacement of the pump to vary the volume of fluid generated as the pump is driven and the second hydraulic pump including a second cam plate movable to vary the displacement of the pump to vary the volume of fluid generated as the pump is driven;

each of the first and second cam plates having a maximum position at which a maximum volume of fluid is generated, each maximum position being determined by an end stop;

a manually operable steering control movable between left and right positions through a center position;

a manually operable speed control movable between forward and reverse positions through a neutral position;

the manually operable speed control being arranged to control a rate of supply of hydraulic fluid from the first hydraulic pump to the first drive motor and from the second hydraulic pump to the second drive motor to control a common speed of rotation of the driven wheels and thus a speed of movement of the tractor;

the manually operable steering control being arranged to control a differential in rate of supply of hydraulic fluid from the first hydraulic pump to the first drive motor and from the second hydraulic pump to the second drive motor to control a relative speed of rotation of the driven wheels and thus a turning direction of the tractor;

a linkage including a first link for controlling the first cam plate and a second link for controlling the second cam plate;

the linkage including a speed control member operable by the manually operable speed control with the speed control member arranged, when actuated, to move both the first and second links for moving the first and second cam plates;

the linkage including a steering member operable by the manually operable steering control with the steering member mounted relative to the speed control member so as, when actuated, to move the first and second links relative to the speed control member to effect differential movement of the first and second cam plates;

the manually operable speed control including a manually operable lever defining a position input and a servo-cylinder arranged in response to the position input to move the speed control member to a position determined by the position input and to maintain the speed control member in the position by pressure in the servo-cylinder;

the manually operable speed control being arranged so as to provide a maximum forward position of the speed control member in which the first and second cam plates are located in their maximum positions against the respective end stop and are maintained in the maximum position by pressure in the servo-cylinder;

and a relief member operable, in the maximum forward position of the speed control member, on operation of the steering member by the manually operable steering control, to relieve pressure from the servo-cylinder to allow movement of the first and second links relative to the speed control member to effect differential movement of the first and second cam plates.

2. The tractor according to claim 1 wherein the relief member acts to allow movement of the speed control member from the maximum forward position.

3. The tractor according to claim 1 wherein the relief member acts to allow movement of the speed control member without requiring movement of the servo-cylinder.

4. The tractor according to claim 1 wherein the relief member comprises a spring mounted to take up movement of the speed control member without requiring movement of the servo-cylinder.

5. The tractor according to claim 4 wherein the spring is mounted at the servo-cylinder.

6. The tractor according to claim 1 wherein the spring is mounted between the servo-cylinder and a reference location.

7. The tractor according to claim 6 wherein the spring comprises two parts each arranged on an opposite side of a center position such that the servo-cylinder body can move in one direction at maximum forward position and in an opposed direction at maximum reverse position.

8. The tractor according to claim 7 wherein each of the two parts of the spring buns against a center plate connected to the reference location.

9. The tractor according to claim 8 wherein there is provided a support member which engages each of the two parts of the spring and holds it away from the center plate when the other of the springs is compressed and butts against the center plate.

10. The tractor according to claim 1 wherein the servo-cylinder includes a cylinder in which the piston is mounted and a servo-control spool connected to the manually operable lever such that the servo-control spool controls supply of hydraulic fluid under pressure to one or other side of the piston depending upon movement of the spool by the manually operable lever.

11. A tractor comprising:
a tractor frame;
an engine mounted on the tractor frame;
a cab mounted on the tractor frame;
a first and a second driven wheels of the tractor mounted at a driven end of the tractor, the first driven wheel including a first hydraulic drive motor for driving the first wheel and the second driven wheel including a second hydraulic drive motor for driving the second wheel;
two non-driven castor wheels of the tractor mounted at a second end of the tractor;
the driven end having mounting assemblies for supporting a crop cutting header at a position in front of the driven end and in front of the cab when the driven end is forwards;
a first and a second hydraulic pump each driven by the engine for generating a source of hydraulic fluid under pressure, with the first hydraulic pump arranged for driving the first hydraulic motor of the first driven wheel and the second hydraulic pump arranged for driving the second hydraulic motor of the second driven wheel;
the first hydraulic pump including a first cam plate movable to vary the displacement of the pump to vary the volume of fluid generated as the pump is driven and the second hydraulic pump including a second cam plate movable to vary the displacement of the pump to vary the volume of fluid generated as the pump is driven;
each of the first and second cam plates having a maximum position at which a maximum volume of fluid is generated, each maximum position being determined by an end stop;
a manually operable steering control movable between left and right positions through a center position;
a manually operable speed control movable between forward and reverse positions through a neutral position;
the manually operable speed control being arranged to control a rate of supply of hydraulic fluid from the first hydraulic pump to the first drive motor and from the second hydraulic pump to the second drive motor to control a common speed of rotation of the driven wheels and thus a speed of movement of the tractor;
the manually operable steering control being arranged to control a differential in rate of supply of hydraulic fluid from the first hydraulic pump to the first drive motor and from the second hydraulic pump to the second drive motor to control a relative speed of rotation of the driven wheels and thus a turning direction of the tractor;
a linkage including a first link for controlling the first cam plate and a second link for controlling the second cam plate;
the linkage including a speed control member operable by the manually operable speed control with the speed control member arranged, when actuated, to move both the first and second links for moving the first and second cam plates;
the linkage including a steering member operable by the manually operable steering control with the steering member mounted relative to the speed control member so as, when actuated, to move the first and second links relative to the speed control member to effect differential movement of the first and second cam plates;
the manually operable speed control including a manually operable lever defining a position input and a servo-cylinder having a servo-cylinder body and a piston including piston rod movable relative to the servo-cylinder body;
the servo-cylinder body being connected to the speed control member and the piston rod being connected to a reference location such that the servo-cylinder acts, in response to the position input, to move the speed control member to a position determined by the position input and to maintain the speed control member in the position by pressure in the servo-cylinder;

the manually operable speed control being arranged so as to provide a maximum forward position of the speed control member in which the first and second cam plates are located in their maximum positions against the respective end stop and are maintained in the maximum position by pressure in the servo-cylinder;

and a relief spring mounted between the piston rod and a reference location so as to allow movement of the servo-cylinder body and the speed control member to allow, in the maximum positions of the first and second cam plates, the first and second links to move relative to the speed control member to effect differential movement of the first and second cam plates.

12. The tractor according to claim 11 wherein the spring comprises two parts each arranged on an opposite side of a center position such that the servo-cylinder body can move in one direction at maximum forward position and in an opposed direction at maximum reverse position.

13. The tractor according to claim 12 wherein each of the two parts of the spring bulls against a center plate connected to the reference location.

14. The tractor according to claim 13 wherein there is provided a support member which engages each of the two parts of the spring and holds it away from the center plate when the other of the springs is compressed and butts against the center plate.

15. The tractor according to claim 11 wherein the servo-cylinder includes a cylinder in which the piston is mounted and a servo-control spool connected to the manually operable lever such that the servo-control spool controls supply of hydraulic fluid under pressure to one or other side of the piston depending upon movement of the spool by the manually operable lever.

* * * * *